US010926161B1

(12) United States Patent
Sevak

(10) Patent No.: US 10,926,161 B1
(45) Date of Patent: Feb. 23, 2021

(54) FLYBOARD

(71) Applicant: Mihirkumar Pankajkumar Sevak, Santa Clara, CA (US)

(72) Inventor: Mihirkumar Pankajkumar Sevak, Santa Clara, CA (US)

( * ) Notice: Subject to any disclaimer, the term of this patent is extended or adjusted under 35 U.S.C. 154(b) by 0 days.

(21) Appl. No.: 16/446,085

(22) Filed: Jun. 19, 2019

Related U.S. Application Data

(60) Provisional application No. 62/749,912, filed on Oct. 24, 2018.

(51) Int. Cl.
| *A63C 17/00* | (2006.01) |
| *A63C 17/12* | (2006.01) |
| *H02N 15/00* | (2006.01) |
| *B60L 15/00* | (2006.01) |
| *A63C 17/14* | (2006.01) |
| *B60L 13/04* | (2006.01) |

(52) U.S. Cl.
CPC .......... *A63C 17/12* (2013.01); *A63C 17/1409* (2013.01); *B60L 13/04* (2013.01); *B60L 15/002* (2013.01); *H02N 15/00* (2013.01); *A63C 2203/12* (2013.01)

(58) Field of Classification Search
CPC ..... A63C 17/12; A63C 17/1409; A63C 15/12; B60L 13/04; B60L 15/002
See application file for complete search history.

(56) References Cited

U.S. PATENT DOCUMENTS

| 7,671,712 | B2 * | 3/2010 | Elliott | H01F 7/0236 335/209 |
| 7,760,058 | B2 * | 7/2010 | Fullerton | H01F 7/0284 335/285 |
| 9,126,487 | B2 * | 9/2015 | Henderson | B60L 13/04 |
| 9,148,077 | B2 * | 9/2015 | Henderson | B60L 50/10 |
| 9,263,974 | B1 | 2/2016 | Henderson et al. | |
| 9,440,714 | B2 * | 9/2016 | Robinson | B63H 21/22 |
| 9,597,978 | B1 * | 3/2017 | Konchitsky | A63C 17/12 |
| 9,694,709 | B1 | 7/2017 | Konchitsky | |
| 2007/0197126 | A1 | 8/2007 | Derrah | |
| 2016/0340035 | A1 * | 11/2016 | Duru | B64C 15/12 |
| 2017/0151889 | A1 | 6/2017 | Melvin et al. | |

* cited by examiner

*Primary Examiner* — Hau V Phan
(74) *Attorney, Agent, or Firm* — William R Berggren; Berggren Law Offices LLC

(57) ABSTRACT

A flyboard comprising a base element and an upper element in communication with each other by magnetic fields having the same polarity and magnetic fields having opposite polarities to permit floatation of the upper element over the lower element while a user is standing on the upper element.

16 Claims, 2 Drawing Sheets

FLYBOARD

FIELD OF THE INVENTION

This invention relates to skateboards that permit low level flying.

BACKGROUND OF THE INVENTION

The image of "hovering" or "levitating" for performing swift lateral movements over solid ground, snow, water or other medium has been observing an increasingly popular trend over recent years. Example of popular sports using "hovering" or levitating" may include skateboarding, surfing, snowboarding, and so on. Skateboarding can be considered an art performed as purely a recreational activity or a job or a mode of transportation.

Some hovering or levitating is achieved by jets of high-pressure air worn on footwear worn by a person to achieve lift. These involve bulky equipment to supply enough air at enough pressure to achieve lift. In addition, the air tends to be disruptive to surrounding surfaces during lateral movement. However, the heights achieved over a surface can provide enjoyment for the user.

Hover boards typically resemble skateboards without wheels utilizing electromagnetic principles for levitation. Various attempts have been made for frictionless displacement of the objects. The frictionless displacement takes place due to the well-known action of two permanent magnets placed on the two surfaces separated between a required distance between them and the forces of attraction or repulsion between these two magnets, depending upon the alignment of the poles of the magnets.

One group of conventional hover boards are characterized by the presence of magnets configured to the bottom of their surfaces, which in turn utilize the repulsive forces, of a plurality of magnets. The force obtained by the magnetic repulsion is utilized to counteract the gravitational force and lift the hover board. However, there are inherent limitations, observed in the conventional hover board models. First, batteries used are only capable of supplying power for few minutes. Second, the conventional hover boards, can float only above fixed conductive surfaces like nonferrous metallic surfaces and they cannot be versatile ones, that is being capable of floating upon all kinds of surfaces including ferrous or non-metallic surfaces and water.

Another group of known hover boards with two boards each with magnets configured to repel each other. The base board had motorized wheels. The two boards are attached together with connectors to create a fixed space between the two boards. The motor to move the wheels provides bulk and-or limited range to external sources of power.

Currently we don't have a hover board useable over ferrous or non-conductive surfaces without separately powered wheels.

SUMMARY OF THE INVENTION

The invention enables a low cost above ferrous or non-conductive surfaces without separately powered wheels. No connectors are required to connect the elements of the flyboard.

The flyboard comprises an article aspect and a method aspect. The article aspect comprises two elements, a base element and an upper element. The base element comprises a bottom surface and a top surface comprising at least one first magnetic field generator configured to project a first magnetic field upward with a single polarity. The upper element having a top surface and a bottom surface with a center portion, a front portion, and a rear portion, and at least one second magnetic field generator affixed to the center portion and configured to project a magnetic field toward the first magnetic field generator with the same polarity as the upward projecting field of the first magnetic generator. It also has at least one third magnetic field generator affixed to the front portion and configured to project a magnetic field toward the first magnetic field generator with the opposite polarity as the upward projecting field of the first magnetic generator, and at least one fourth magnetic field generator affixed to the rear portion and configured to project a magnetic field toward the first magnetic field generator with the opposite polarity as the upward projecting field of the first magnetic generator. Of course, the fly board may comprise a base element configures as the upper element of above and the upper element configured as the base element of above.

The method of operating step includes four steeps. One step is providing a flyboard as described above. Another step is receiving a user on the top of the base element. Still another step is controlling one or more magnetic field generators to achieve an elevation of the base element over the upper element. Another step is leaning in a direction to move. The base element is magnetically affixed to the upper element and magnetically repelled from the upper element at the same time.

The flyboard of the invention has the advantage of the ability to move over both ferrous and not-ferrous surfaces including snow and water, the later if pulled by a power source such as, for example a boat. It is also able to move with the tilting of the user toward a direction of movement and not need for driven wheels when on land, not needing wheels when moving downhill on snow, or tilting away from the direction of movement when being pulled by a power source such as, for example a boat on water.

The previously mentioned features and advantages will become apparent from the following detailed description of illustrative embodiments thereof, which is to be read in connection with the accompanying drawings.

BRIEF DESCRIPTION OF THE DRAWINGS

One or more features or preferred forms of the invention are described in the accompanying drawings. The drawings are described briefly below.

Figure 1:
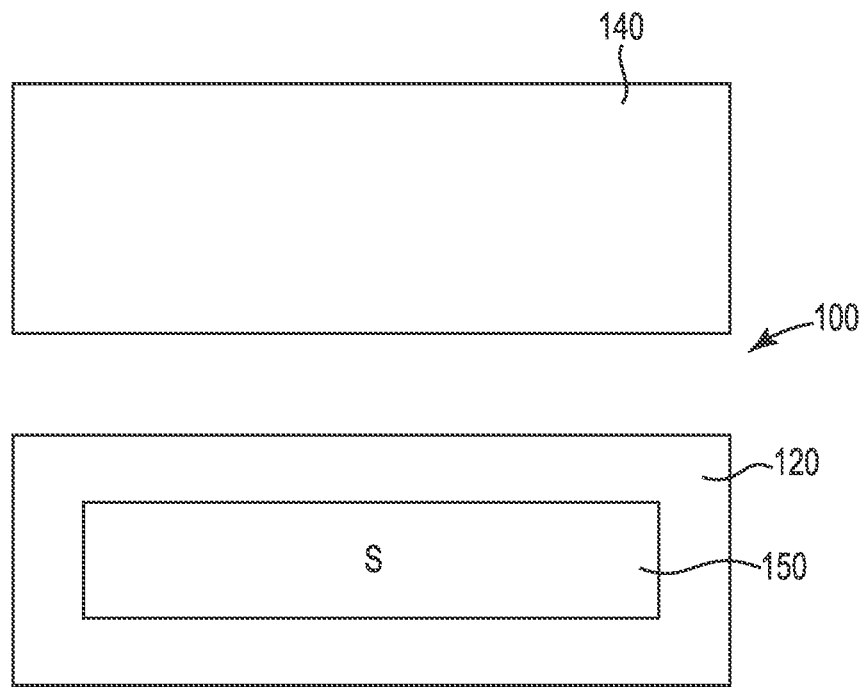
FIG. 1 is a top view of the base element and the top element of an embodiment of the invention.

While the invention is amenable to various modifications and alternative forms, specifics thereof have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF SOME EMBODIMENTS OF THE INVENTION

The invention is a flyboard that one can either use as a skateboard, a snow board, a standing board, or a water ski or have an experience of flying board that can be operated just like a skateboard, snow board, standing board or water ski. This flyboard would have modern technologies inbuilt like voice control, camera control, and GPS The problem is that currently there is no technologies that allow low height aviation at low cost that uses human movement for propulsion like with skateboards or snowboards.

Current technologies include air jets, propellers like in drowns, a board with a magnetic field to countering gravity by repel a board over a fixed-conductive surface like non-ferrous metallic surface. Another is a pair of board separated by magnetic repulsion, held together by connectors, and moved by powered wheels. Using standard fossil fuel machines one can achieve above ground experience or using a powerful drones one can create similar flying skateboards, however they all require external power source and can be useful only till these power sources have no power.

Primarily this invention enables low cost above ground experience over a variety of surfaces without external wheel propulsion. This invention does not use fossil fuels or electrical power to move the wheels that would contribute to well-known environmental issues. It also would be able to move over ferrous and non-ferrous surfaces and even liquid surfaces. It would not need motorized wheel for movement and would not have connectors to attach the two elements.

The invention involves a mechanism that uses magnets which will make above ground experience possible. As most of the people know in magnets there are two polarities typically by convention labeled North and South. Between two magnets opposite polarities attract each other whereas same polarities repel each other. Using these principals, a flyboard has been designed that has a base board with a powerful magnet facing upwards with polarity of North and an upper board which has an equally powerful magnet facing downward with polarity North. This similar polarity repels both magnet and allows board to be above ground. Only with these two magnets is the aviation/flight possible but due to repelling property two parts would be thrown away in two different directions. To address this issue, the flyboard includes added two more magnets on the upper board facing downwards with polarity south. Their polarity being opposite to the base's upward facing polarity they attract each other and keeps the whole mechanism in balance and makes the device above the ground. The base also has spherical wheels in the bottom so when the top is pushed away the base moves with it due to attraction of two opposite polarities of balancing magnets. The magnets may be permanent magnets with fixed magnetic fields or electromagnets with variable fields that enable them to lift different weight or the same weight different heights and may be turned off also.

The detail invention comprises an article aspect and a method aspect. The article aspect comprises two elements, a base element and an upper element. The base element comprises a bottom surface a top surface having at least one first magnetic field generator configured to project a first magnetic field upward with a single polarity. The upper element having a top surface and a bottom surface with a center portion, a front portion, and a rear portion, and at least one second magnetic field generator affixed to the center portion and configured to project a magnetic field toward the first magnetic field generator with the same polarity as the upward projecting field of the first magnetic field generator. It also has at least one third magnetic field generator affixed to the front portion and configured to project a magnetic field toward the first magnetic field generator with the opposite polarity as the upward projecting field of the first magnetic generator, and at least one fourth magnetic field generator affixed to the rear portion and configured to project a magnetic field toward the first magnetic field generator with the opposite polarity as the upward projecting field of the first magnetic generator.

As discussed above the flyboard comprises two boards, a base element and an upper element. The upper element is shaped like for example, a skateboard, a surfboard, a snowboard, a snake-board, a freestyle scooter board, a standing board, a water ski, and a carve board. However, it would be clear for those skilled in the art that various types, sizes and shapes of the base element and the upper element. It can be readily envisioned without deviating from the scope of the present invention. The base element may have similar shape and be of similar materials as the upper element or may differ if its function is not impaired, that of moving in tandem with the upper element carrying the user.

The magnetic generators emit magnetic fields with required magnetic flux density for lifting the user. The magnetic generators or sources of magnetic fields constituent materials of the magnetic sources may include, but not limiting to, that of permanent magnets, electromagnets, electrets, ferromagnetic materials, or soft magnetic materials, and that of superconductive magnetic materials. Further the magnetic sources may be either singular or might even include a plurality of magnetic sources. In an embodiment, the magnetic sources may be selected based on one or more parameters such as, but are not limited to, required magnetic flux density, polarity, strength of magnetic field and one or more other desired factors.

In some embodiments the magnetic field strengths of the generators are similar. In some embodiments the first magnetic field generator and the second field generator have similar magnetic field strengths. In some embodiments the magnetic field strengths of the first magnetic field generator is like that of the third and fourth magnetic field generator.

In some embodiments, the base element bottom may comprise at least one wheel. The wheel may have a freedom of rotation of 360 degrees in a horizontal plane parallel to the bottom of the base element. The number of wheel-s may be one, two, three, four, five or more. The wheel may be cylindrical or spherical. Generally, wheels are suitable when the fly board is intended to pass over a solid surface.

An embodiment of the invention also comprises a control element. The control element may be in communication with at least one of the first magnetic field generators, second magnetic field generator, third magnetic field generator, and fourth magnetic field generator that is further configured to change magnetic field intensity. The wheels may also have a braking mechanism and the control element may be in communication with the braking element. The control element also may be audio or manually controlled remotely or have components that are audio or manually controlled remotely.

An embodiment of the invention may have a camera enabled features like fac-recognition based activation or some other recognition means.

An embodiment of the invention may have a GPS functionality which can allow user to do some advanced functionalities.

While this invention is illustrated and described m a preferred embodiment, and it is to be understood that a hovering skateboard may be produced in many different sizes, shapes and colors. The embodiment(s) of the present invention has been depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present disclosure.

FIG. 1 is a top view of the base element and the top element of an embodiment of the invention. A flyboard 100 is shown with a base element 120 and an upper element 140. The top surface of base element 120 has a first magnetic field generator 150 having an upward projecting magnetic field with a polarity shown as South in the figure although it may also be North. The top surfaced of the upper element is configured to hold a user (not shown).

Figure 2:
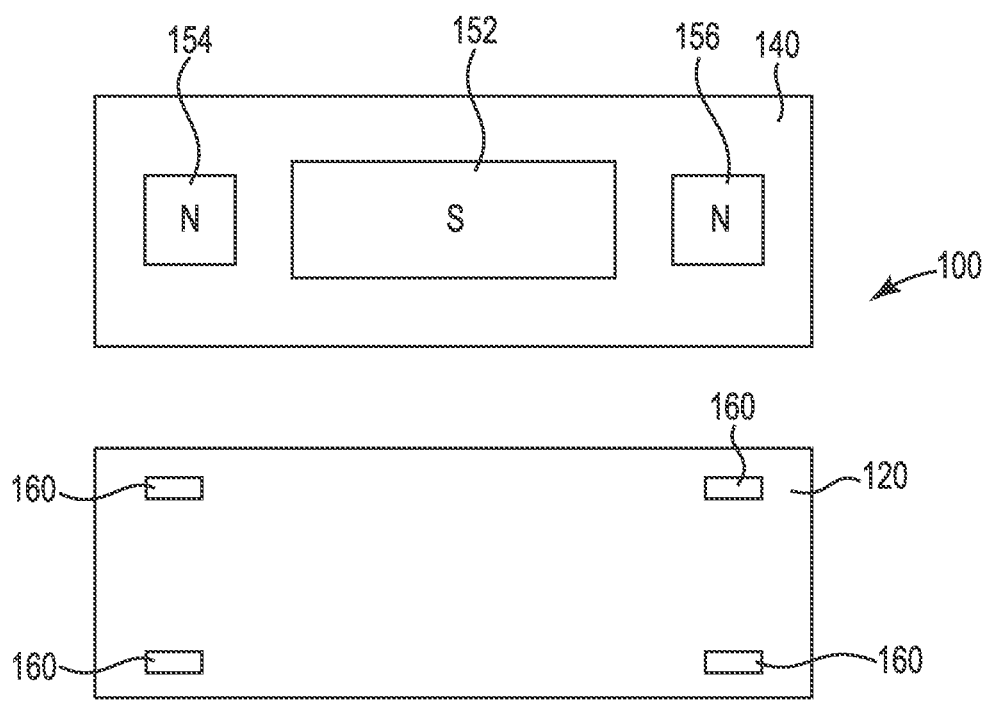
FIG. 2 is a bottom view of the base element and the top element of the embodiment of the invention shown in FIG. 1.

FIG. 2 is a bottom view of the base element and the top element of the embodiment of the invention shown in FIG. 1. The bottom surface of upper element 140 has a second magnetic field generator 152 having a downward projecting magnetic field with a polarity shown as South in the figure capable of repelling the first magnetic field although it also may be North if the first magnetic field projected an upward polarity of the same North as long as it repels magnetic field of the first magnetic field generator 150. The bottom surface of upper element 140 has a third magnetic field generator 154 and a fourth magnetic field generator 156 having downward projecting magnetic fields each with a polarity shown as North in the figure to attract the first magnetic field. The first, second third and fourth magnetic fields may all bed the opposite if desired and repelling and attraction results remain the same. The bottom surface of the base element 120 also has at least one wheel 160 in this embodiment so that it is suitable to pass over solid land. The wheel 160 may have a braking feature (not shown) configured to stop the flyboard or slow it down. Also, a controller (not shown) may be used to control various features such as, for example, magnetic field strength of the various magnetic fields, and braking action on the wheel(s).

Figure 3:
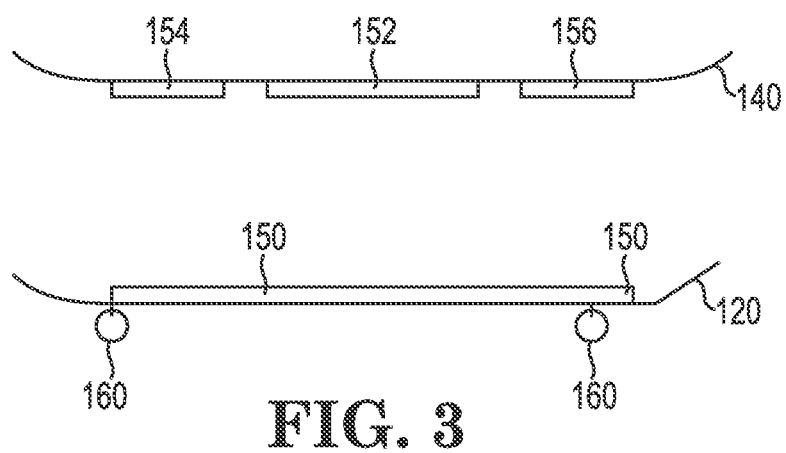
FIG. 3 is a side view of the base element and the side element of the embodiment of the invention shown in FIG. 1.

FIG. 3 is a side view of the base element and the side element of the embodiment of the invention shown in FIG. 1. The flyboard 100 is shown with the front and back ends of base element 120 and upper element 140 rising upward on this embodiment but other embodiments nay have no rise. Magnetic field generators are shown attached to the bottom of the upper element and the top of the base element with wheels shown attached to the bottom surface of the base element.

The method of operating step includes four steeps. One step is providing a flyboard as described above. Another step is receiving a user on the top of the base element. Still another step is controlling one or more magnetic field generators to achieve an elevation of the base element over the upper element. Another step is leaning in a direction to move. The base element is magnetically affixed to the upper element and magnetically repelled from the upper element at the same time.

The invention may be used on a fluid surface such as water, a slippery surface such as snow and a solid surface such as land. When on water, another means of propulsion such as a power boat paddle is used to provide movement. The user often leans backward from the direction of desired movement. When on snow, the movement is generally down-hill and the user leans forward toward the desired direction.

When on land, the invention generally also includes at least one wheel and the user leans forward toward the desired direction of movement. In some embodiments, a brake is used to stop forward motion.

The many features and advantages of the invention are apparent from the above description. It is apparent from the foregoing that a new and improved hovering skateboard has been provided. The invention is quite simple and can be used in different surfaces. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention.

While the invention has been described in connection with what is presently considered to be the most practical and various embodiments, it is to be understood that the invention is not to be limited to the disclosed embodiments but on the contrary, is intended to cover various modifications and equivalent arrangements included within the spirit and scope of the appended claims.

This written description uses examples to disclose the invention, including the best mode, to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims The many features and advantages of the invention are apparent from the above description. It is apparent from the foregoing that a new and improved hovering skateboard has been provided. The invention is quite simple and can be used on different surfaces. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention.

While the invention has been described in connection with what is presently considered to be the most practical and various embodiments, it is to be understood that the invention is not to be limited to the disclosed embodiments but on the contrary, is intended to cover various modifications and equivalent arrangements included within the spirit and scope of the appended claims.

This written description uses examples to disclose the invention, including the best mode, and to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims

I claim:

1. A flyboard comprising:
   a base element having a bottom surface and a top surface comprising at least one first magnetic field generator configured to project a first magnetic field upward with a single polarity, and
   an upper element having a top surface and a bottom surface with a center portion, a front portion, and a rear portion, at least one second magnetic field generator affixed to the center portion and configured to project a magnetic field toward the first magnetic field generator with the same polarity as the upward projecting field of the first magnetic generator, at least one third magnetic field generator affixed to the front portion and configured to project a magnetic field toward the first magnetic field generator with the opposite polarity as the upward projecting field of the first magnetic generator, and at least one fourth magnetic field generator affixed to the rear portion and configured to project a magnetic field toward the first magnetic field generator with the opposite polarity as the upward projecting field of the first magnetic generator.

2. The flyboard of claim 1 wherein the bottom surface of the base element comprises at least one wheel.

3. The flyboard of claim 1 wherein the base element is configured to float on water.

4. The flyboard of claim 1 wherein at least one of the magnetic field generators comprises a permanent magnet.

5. The flyboard of claim 4 wherein the control element is audio or manually controlled remotely.

6. The flyboard of claim 1 wherein at least one of the magnetic field generators is based on electricity.

7. The flyboard of claim 1 further comprising a control element in communication with at least one of the first magnetic field generators, second magnetic field generator, third magnetic field generator, and fourth magnetic field generator that is further configured to change magnetic field intensity.

8. The flyboard of claim 1 wherein the magnetic field of the first magnetic generator and the magnetic field of the second magnetic field generator have intensity strengths that are similar.

9. The flying skateboard of claim 1 wherein the wheels number between 1 and 6.

10. The flying skateboard of claim 1 wherein the base element is configured to float on water with a downward force of at least 300 pounds.

11. A flyboard comprising:
    an upper element having a bottom surface and a top surface comprising at least one first magnetic field generator configured to project a first magnetic field downward with a single polarity, and
    a base element having a top surface and a bottom surface with a center portion, a front portion, and a rear portion, at least one second magnetic field generator affixed to the center portion and configured to project a magnetic field toward the first magnetic field generator with the same polarity as the downward projecting field of the first magnetic generator, at least one third magnetic field generator affixed to the front portion and configured to project a magnetic field toward the first magnetic field generator with the opposite polarity as the upward projecting field of the first magnetic generator, and at least one fourth magnetic field generator affixed to the rear portion and configured to project a magnetic field toward the first magnetic field generator with the opposite polarity as the upward projecting field of the first magnetic generator.

12. The flyboard of claim 11 wherein the bottom surface of the base element comprises at least one wheel.

13. A method of operating a flyboard comprising:
    providing a flyboard comprising:
    i. a base element having a bottom surface and a top surface comprising at least one first magnetic field generator configured to project a first magnetic field upward with a single polarity, and
    ii. an upper element having a top surface and a bottom surface with a center portion, a front portion, and a rear portion, at least one second magnetic field generator affixed to the center portion and configured to project a magnetic field toward the first magnetic field generator with the same polarity as the upward projecting field of the first magnetic generator, at least one third magnetic field generator affixed to the front portion and configured to project a magnetic field toward the first magnetic field generator with the opposite polarity as the upward projecting field of the first magnetic generator, and at least one fourth magnetic field generator affixed to the rear portion and configured to project a magnetic field toward the first magnetic field generator with the opposite polarity as the upward projecting field of the first magnetic generator;
    receiving a user on the top of the base element;
    controlling one or more magnetic field generators to achieve an elevation of the base element over the upper element; and
    leaning in a direction to move,
    wherein the base element is magnetically affixed to the upper element and magnetically repelled from the upper element at the same time.

14. The method of operating a flyboard of claim 13 further comprising a power source configured to pull the user over water.

15. The method of operating a flyboard of claim 13 wherein the bottom surface of the base element further comprises at least one wheel with a 360-degree freedom of rotation in a horizontal plain parallel to the bottom of the base element for movement on solid land.

16. The method of operating a flyboard of claim 15 further comprising:
    applying braking action upon the wheels to decrease the speed of the flyboard.

* * * * *